(12) United States Patent
Yang et al.

(10) Patent No.: US 10,351,446 B2
(45) Date of Patent: Jul. 16, 2019

(54) DESALINATION SYSTEM AND METHOD

(71) Applicant: BL Technologies, Inc., Minnetonka, MN (US)

(72) Inventors: Linglu Yang, Niskayuna, NY (US); Hai Yang, Niskayuna, NY (US); Wei Lu, Niskayuna, NY (US); John Harold Barber, Niskayuna, NY (US)

(73) Assignee: BL TECHNOLOGIES, INC., Minnetonka, MN (US)

( * ) Notice: Subject to any disclaimer, the term of this patent is extended or adjusted under 35 U.S.C. 154(b) by 495 days.

(21) Appl. No.: 14/349,914

(22) PCT Filed: Sep. 19, 2012

(86) PCT No.: PCT/US2012/056028
§ 371 (c)(1),
(2) Date: Apr. 4, 2014

(87) PCT Pub. No.: WO2013/058922
PCT Pub. Date: Apr. 25, 2013

(65) Prior Publication Data
US 2014/0246318 A1    Sep. 4, 2014

(30) Foreign Application Priority Data

Oct. 21, 2011 (CN) .......................... 2011 1 0323972

(51) Int. Cl.
*B01D 61/48* (2006.01)
*C02F 1/469* (2006.01)

(52) U.S. Cl.
CPC ............ *C02F 1/4695* (2013.01); *B01D 61/48* (2013.01); *C02F 1/4691* (2013.01); *C02F 2303/22* (2013.01)

(58) Field of Classification Search
CPC .. C02F 1/4695; C02F 1/4691; C02F 2303/22; B01D 61/48
See application file for complete search history.

(56) References Cited

U.S. PATENT DOCUMENTS 5,026,465 A    6/1991    Katz et al.
5,120,416 A    6/1992    Parsi et al.
(Continued)

FOREIGN PATENT DOCUMENTS

CN    201148367 Y    11/2008
CN    101563296 A    10/2009
(Continued)

OTHER PUBLICATIONS

PCT Search Report and Written Opinion issued in connection with corresponding PCT Application No. PCT/US2012/056028 on Dec. 21, 2012.
(Continued)

*Primary Examiner* — Arun S Phasge

(57) ABSTRACT

A desalination system comprises at least one desalination cell. The at least one desalination cell comprises first and second electrodes, an anion exchange layer and a cation ion exchange layer disposed on the respective first and second electrodes, and a spacer disposed between the first and second electrodes. The at least one desalination cell further comprises an ion exchange resin disposed between the first and second electrodes. A desalination system and a method for removing ions from an aqueous stream are also presented.

17 Claims, 8 Drawing Sheets

(56) References Cited

U.S. PATENT DOCUMENTS

| | | |
|---|---|---|
| 5,316,637 A | 5/1994 | Ganzi et al. |
| 5,584,981 A | 12/1996 | Turner et al. |
| 5,736,023 A | 4/1998 | Gallagher et al. |
| 5,804,057 A | 9/1998 | Zhou et al. |
| 5,954,935 A | 9/1999 | Neumeister et al. |
| 6,126,805 A | 10/2000 | Batchelder et al. |
| 6,274,018 B1 | 8/2001 | Hidaka |
| 6,296,751 B1 | 10/2001 | Mir |
| 6,423,205 B1 | 7/2002 | Akahori et al. |
| 6,824,662 B2 | 11/2004 | Liang et al. |
| 7,338,600 B2 | 3/2008 | Chidambaran et al. |
| 7,813,106 B2 | 10/2010 | Cai et al. |
| 9,011,664 B2 | 4/2015 | Takahashi et al. |
| 9,023,215 B2 | 5/2015 | Ganzi et al. |
| 2003/0079993 A1 | 5/2003 | Miwa et al. |
| 2007/0108056 A1 | 5/2007 | Nyberg et al. |
| 2007/0284313 A1 | 12/2007 | Lee et al. |
| 2010/0220430 A1 | 9/2010 | Bae et al. |
| 2011/0024287 A1 | 2/2011 | Zheng et al. |
| 2011/0024354 A1 | 2/2011 | Xia et al. |
| 2011/0042205 A1 | 2/2011 | Kim et al. |
| 2011/0162965 A1 | 7/2011 | Kim et al. |
| 2011/0180477 A1 | 7/2011 | Ganzi et al. |
| 2011/0210069 A1 | 9/2011 | Xiong et al. |
| 2012/0037511 A1* | 2/2012 | Xiong .................. C02F 1/4604 205/746 |

FOREIGN PATENT DOCUMENTS

| | | |
|---|---|---|
| CN | 201694874 U | 1/2011 |
| CN | 102167463 A | 8/2011 |
| DE | 4418812 A1 | 12/1995 |
| EP | 0680932 A2 | 11/1995 |
| JP | 07308548 A | 11/1995 |
| JP | 1071338 A | 3/1998 |
| JP | 11319838 A | 11/1999 |
| JP | 2000084371 A | 3/2000 |
| JP | 2000093757 A | 4/2000 |
| JP | 2001121150 A | 5/2001 |
| JP | 2002336865 A | 11/2002 |
| JP | 2003136063 A | 5/2003 |
| JP | 2003145163 A | 5/2003 |
| JP | 2003200166 A | 7/2003 |
| JP | 2003200167 A | 7/2003 |
| JP | 2005103454 A | 4/2005 |
| JP | 2008212871 A | 9/2008 |
| JP | 2010206171 A | 9/2010 |
| JP | 2010540209 A | 12/2010 |
| JP | 2011041940 A | 3/2011 |
| JP | 2011104513 A | 6/2011 |
| JP | 2011140018 A | 7/2011 |
| JP | 2011167643 A | 9/2011 |
| WO | 1996022162 A1 | 7/1996 |
| WO | 1999048820 A1 | 9/1999 |
| WO | 2004060815 A1 | 7/2004 |
| WO | 2010106021 A1 | 9/2010 |

OTHER PUBLICATIONS

Unofficial English Translation of Chinese Office Action issued in connection with corresponding CN Application No. 201110323972.0 on Oct. 25, 2013.

Tate, "An Introduction to Spiral-Wound EDI", Water Technology, Jan. 2003, Retrieved from the Internet: URL:http://www.agapewater.com/wp-content/uploads/2014/08/watertechnologyjan03.pdf [retrieved on May 24, 2016].

European Office Action issued in connection with corresponding EP Application No. 12775084.2 on Jun. 6, 2016.

Unofficial English Translation of Japanese Office Action issued in connection with corresponding JP Application No. 2014537074 on Jun. 14, 2016.

European Office Action issued in connection with corresponding EP Application No. 12775084.2 on Jun. 22, 2015.

Japanese Search Report issued in connection with corresponding JP Application No. 2014-537074 dated May 24, 2016.

Notice of Allowance issued in connection with corresponding JP Application No. 2014-537074 dated Dec. 20, 2016.

* cited by examiner

DESALINATION SYSTEM AND METHOD

BACKGROUND OF THE DISCLOSURE

The invention relates generally to desalination systems and methods for water recovery. More particularly, this invention relates to desalination systems and methods for removal of hardness ions for product water recovery.

In industrial processes, large amounts of wastewater, such as aqueous saline solutions are produced. Generally, such wastewater is not suitable for direct consumption in domestic or industrial applications. In view of the limited eligible water sources, it is desirable to recover eligible water from liquid streams, such as wastewater, seawater or brackish water.

Typically, due to continuous operation, and stable and relatively higher quality of product water, electrodeionization (EDI) apparatuses have been employed for processing such liquid streams, for example for production of pure water. Generally, the EDI apparatuses use conventional electrodialysis systems filled with ion exchange resin beads to process the liquid streams. However, during operation, the EDI apparatuses have a hardness tolerance for the liquid streams to be processed. For example, the hardness tolerance of the EDI apparatuses is about less than 1 ppm, which may need rigorous pretreatment of the liquid streams to decrease the hardness therein before the liquid streams are introduced into the EDI apparatus.

There have been attempts to pretreat the liquid streams to decrease the hardness therein. For example, two stages of reversal osmosis (RO) apparatuses are employed. However, due to employment of two stages of the reversal osmosis apparatuses, the system cost may be higher for decreasing the hardness in the liquid streams.

Therefore, there is a need for new and improved desalination systems and methods for removal of hardness ions for water recovery.

BRIEF DESCRIPTION OF THE DISCLOSURE

A desalination system for ion removal from an aqueous stream is provided in accordance with one embodiment of the invention. The desalination system comprises at least one desalination cell. The at least one desalination cell comprises first and second electrodes, an anion exchange layer and a cation ion exchange layer disposed on the respective first and second electrodes, and a spacer disposed between the first and second electrodes. The at least one desalination cell further comprises an ion exchange resin disposed between the first and second electrodes.

A desalination system for ion removal from an aqueous stream is provided in accordance with another embodiment of the invention. The desalination system comprises a desalination device. The desalination device comprises first and second electrodes, at least one bipolar electrode disposed between the first and second electrodes, and a plurality of spacers disposed between each pair of the adjacent electrodes. The desalination device further comprises anion and cation exchange layers disposed on the respective electrodes of each pair of the adjacent electrodes, and an ion exchange resin disposed between each pair of adjacent electrodes Embodiment of the invention further provides a method for removing ions from an aqueous stream. The method comprises passing a first feed stream through an ion exchange resin disposed between an anion exchange layer and a cation exchange layer disposed on respective first and second electrodes of a desalination cell in a charging state of the desalination cell to produce an effluent stream and passing a second feed stream through the ion exchange resin to carry ions removed from the first feed stream out of the desalination cell in a discharging state of the desalination cell to produce a concentrate stream.

These and other advantages and features will be better understood from the following detailed description of preferred embodiments of the invention that is provided in connection with the accompanying drawings.

DETAILED DESCRIPTION OF THE INVENTION

Preferred embodiments of the present disclosure will be described hereinbelow with reference to the accompanying drawings. In the following description, well-known functions or constructions are not described in detail to avoid obscuring the disclosure in unnecessary detail.

Figure 1:
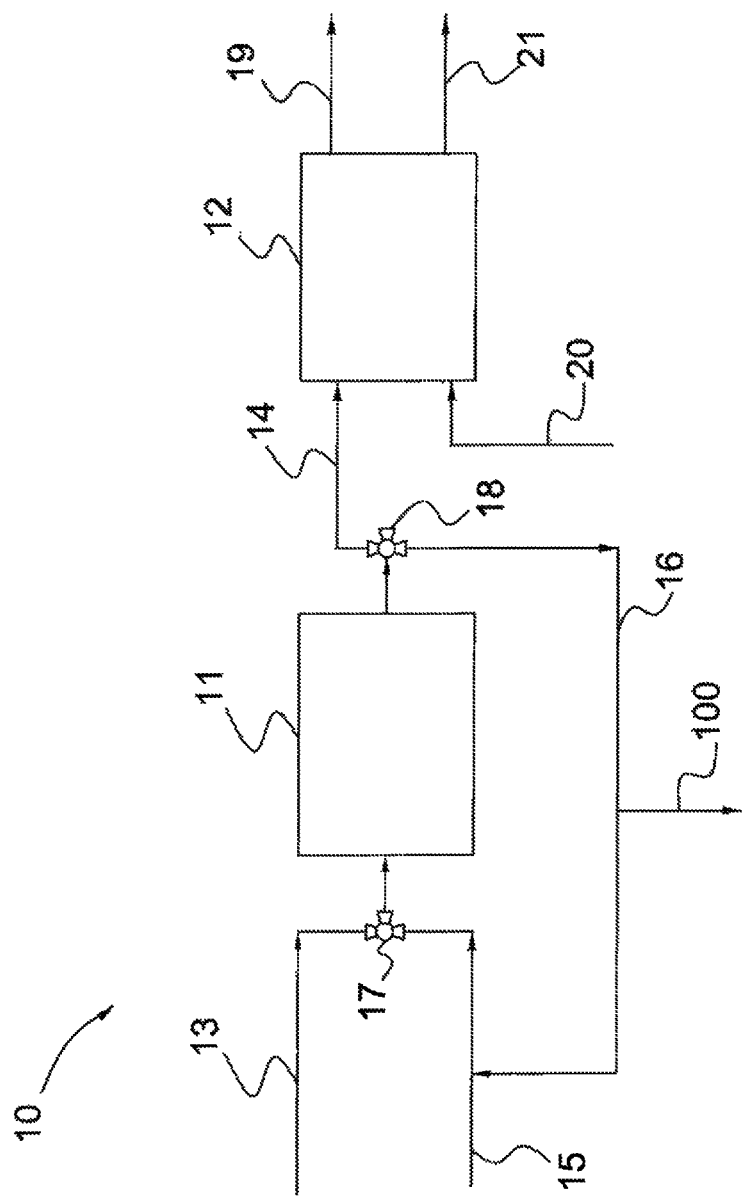
FIG. 1 is a schematic diagram of a desalination system in accordance with one embodiment of the invention.

FIG. 1 is a schematic diagram of a desalination system 10 in accordance with one embodiment of the invention. As illustrated in FIG. 1, the desalination system 10 comprises a desalination apparatus 11 and an electrodeionization (EDI) apparatus 12 in fluid communication with the desalination apparatus 11.

The desalination apparatus 11 is configured to receive a first feed (an aqueous) stream 13 having salts or other impurities from a first liquid source (not shown) for desalination so as to remove charged species or target ions therein to produce an effluent stream 14. In non-limiting examples, the salts in the first feed stream 13 may include charged ions, such as sodium ($Na^+$), chlorine ($Cl^-$), hardness ions including magnesium ($Mg^{2+}$) and/or calcium ($Ca^{2+}$), and/or other ions. In one non-limiting example, the charged ions in the first feed stream 13 at least include target ions, such as hardness ions.

For the illustrated arrangement, the desalination apparatus 11 is further configured to receive a second feed stream 15 from a second liquid source after desalination of the first feed stream 13 so as to carry the charged species or target ions removed from the first feed stream 13 out of the desalination apparatus 11 to produce a concentrate stream 16, which has a higher concentration of charged species than a second feed stream 15.

In the illustrated example, the first feed stream 13 and the effluent stream 14 are introduced into and out of the desalination apparatus 11 via valves 17, 18 in a charging state of the desalination apparatus 11, respectively. The second feed streams 15 and the concentrate stream 16 are introduced into and out of the desalination apparatus 11 via the valves 17, 18 in a discharging state of the desalination apparatus 11, respectively. In the charging state, the flow paths of the second feed stream 15 and the concentrate stream 16 are closed by the respective valves 17, 18. In the discharging state, the flow paths of the first feed stream 13 and the product stream 14 are closed by the respective valves 17, 18.

The concentrate stream 16 may be redirected into the second feed stream 15 so as to be circulated into the desalination apparatus 11. As the circulation of the concentrate stream 16 continues, the concentration of the salts or other impurities continually increases until the concentrate stream 16 is saturated or supersaturated. As a result, the degree of saturation or the supersaturation may reach a point where precipitation begins to take place in the concentrate stream 16. In some examples, at least a portion of the concentrate stream 16 may be discharged from a passageway 100.

The first feed stream 13 and the second feed stream 15 may or may not comprise the same salts or impurities, and may or may not have the same concentration of the salts or the impurities. In non-limiting examples, the first and second feed streams 13, 15 may be provided by the same (or a single) liquid source. In certain applications, the first feed stream 13 may act as the second feed stream 15 in the discharging state of the desalination apparatus 11. The valves 17, 18 may or may not be employed.

Thus, due to desalination of the desalination apparatus 11, at least a portion of the charged or target ions including hardness ions in the first feed stream 13 may be removed. As a result, the effluent stream 14 is produced and then may be introduced into the EDI apparatus 12 for further processing, which may be a dilute liquid and have a lower concentration of the charged species, such as hardness ions as compared to the first feed stream 13.

The effluent stream 14 may be circulated into the desalination apparatus 11 or introduced into any other suitable desalination apparatuses for further processing to remove the charged species therein before being introduced into the EDI apparatus 12. In certain applications, the EDI apparatus may or may not be employed based on different applications.

As used herein, the term "EDI" means an electrochemical purification process using ion exchange membranes and ion exchange resin beads to remove target ions or charged species from water or other fluids so as to produce higher quality water, for example, pure or ultrapure water.

The EDI apparatus 12 comprises a pair of electrodes configured to act as an anode and a cathode, respectively. A plurality of alternating anion and cation exchange membranes are disposed between the anode and the cathode to form a plurality of alternating first and second channels therebetween, which are also referred to as dilute and concentrate channels under operating conditions. A plurality of spacers are disposed between each pair of the membranes, and between the electrodes and the respective adjacent membranes, which may be similar to the structure of an electrodialysis (ED) apparatus. Similarly, the anion exchange membrane(s) are configured to be passable for anions. The cation exchange membrane(s) are configured to be passable for cations.

In addition, based on different applications, the first channels or the second channels may be filled with ion exchange resin for facilitation of transportation of ions, enhancing the conductivity between the adjacent ion exchange membranes, and electrochemical splitting of water. In certain applications, the first channels or the second channels may be partially or entirely filled with the ion exchange resin. In one non-limiting example, the first (dilute) channels are filled with the ion exchange resin.

For some arrangements, the electrodes of the EDI apparatus 12 may be in the form of plates that are disposed parallel to each other to form a stacked structure. Alternatively, the electrodes may be arranged in varying configurations. For example, the electrodes may be disposed concentrically with a spiral and continuous space therebetween. In some applications, the electrodes may include electrically conductive materials. The spacers may comprise any ion-permeable, electronically nonconductive material, including membranes and porous and nonporous materials.

In non-limiting examples, the cathode of the EDI apparatus 12 may include stainless steel. The anode the EDI apparatus 12 may include iridium oxide or platinum coated titanium. The anion exchange membrane may comprise a polymeric material that includes quaternary amine groups. The cation exchange membrane may comprise a polymeric material that includes sulfonic acid groups and/or carboxylic acid groups. The ion exchange resin may include crosslinked polystyrene or other suitable materials.

Accordingly, during operation, an electrical current is applied to the EDI apparatus 12. The effluent stream 14 from the desalination apparatus 11 is introduced into the dilute channels filled with the ion exchange resin beads for further removal of the target ions, such as the hardness ions therein so as to produce a product fluid 19 with a higher quality. An input stream 20 from a liquid source (not shown) is introduced into the concentrate channels to carry the removed target ions from the respective dilute channels out of the EDI apparatus 12 so as to produce a concentrate fluid 21. In certain applications, the product fluid 19 may be circulated into the EDI apparatus 12 for further processing. The concentrate stream 16 from the desalination apparatus 11 may be introduced into the concentrate channels of the EDI apparatus 12 to carry away the removed target ions.

Meanwhile, water splitting reactions occur in the ion exchange resin in the first channels to produce $H^+$ and $OH^-$ for regeneration of the ion exchange resin for facilitation of continuous operation. An electrolyte stream (not shown) may pass through surfaces of the electrodes to remove gases, such as hydrogen and chlorine generated during the operation to protect the electrodes.

Generally, the EDI apparatus 12 has a hardness tolerance for a liquid to be processed therein. For example, the hardness tolerance of the EDI apparatuses is typically about less than 1 ppm. In order to decrease the hardness in the liquid to a suitable level so as to alleviate or avoid scaling or fouling tendency in the EDI apparatus 12 during processing, as depicted in FIG. 1, the desalination apparatus 11 is employed to pretreat the first feed stream 13 so as to produce the effluent stream 14 having a suitable level of the target ions including, but not limited to the hardness ions for further processing in the EDI apparatus 12.

Figure 2:
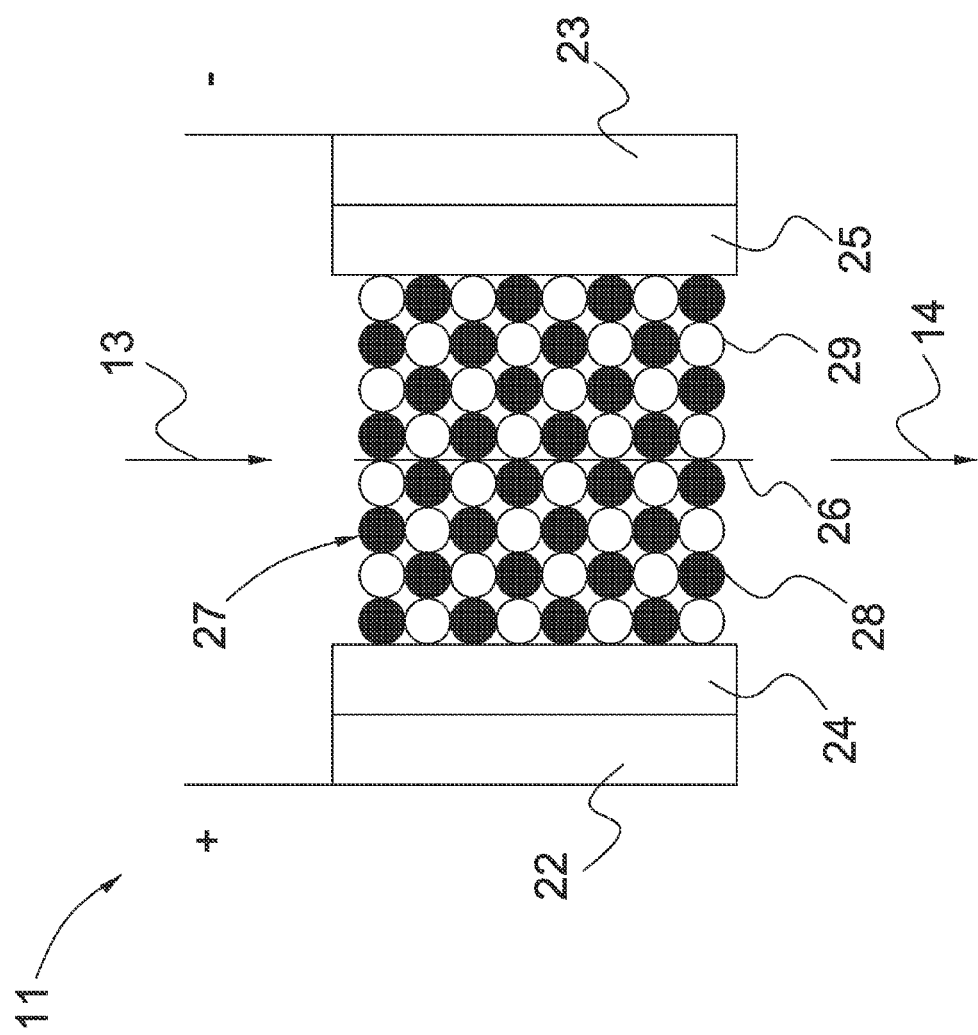
FIG. 2 is a schematic diagram of a desalination apparatus of the desalination system shown in FIG. 1 in accordance with one embodiment of the invention.

FIG. 2 illustrates a schematic diagram of the desalination apparatus 11 in accordance with one embodiment of the invention. As illustrated in FIG. 2, the desalination apparatus 11 comprises a first electrode 22, a second electrode 23, an anion exchange layer 24, a cation exchange layer 25, and a spacer 26, which is also referred to as a desalination cell. As used herein, the term "layer" may not indicate a particular thickness of the material.

In the illustrated example, the first and second electrodes 22, 23 are connected to positive and negative terminals of a power source (not shown) so as to act as an anode and a cathode, respectively. Accordingly, the anion exchange layer 24 is in intimate contact with the anode 22 and the cation exchange layer 25 is in intimate contact with the cathode 23. Alternatively, the first electrode 22 and the second electrode 23 may act as a cathode and an anode respectively, so that the anion exchange layer 24 and the cation exchange layer 25 may be disposed on the anode 23 and the cathode 22, respectively.

For some arrangements, the first and second electrodes 22, 23 may be titanium plate or platinum coated titanium plate. In other examples, the first and second electrodes 22, 23 may include electrically conductive materials, which may or may not be thermally conductive, and may have particles with smaller sizes and large surface areas. The electrically conductive material may include one or more carbon materials. Non-limiting examples of the carbon materials include activated carbon particles, porous carbon particles, carbon fibers, carbon aerogels, porous mesocarbon microbeads, or combinations thereof. In other examples, the electrically conductive materials may include a conductive composite, such as oxides of manganese, or iron, or both, or carbides of titanium, zirconium, vanadium, tungsten, or combinations thereof.

In the illustrated example, the first and second electrodes 22, 23 are in the form of plates that are disposed parallel to each other to form a stacked structure. In other examples, the first and second electrodes 22, 23 may have varied shapes, such as a sheet, a block, or a cylinder. In addition, the first and second electrodes 22, 23 may be arranged in varying configurations. For example, the first and second electrodes 22, 23 may be disposed concentrically with a spiral and continuous space therebetween.

In some applications, the anion and cation exchange layers 24, 25 may be configured to facilitate ion transportation from a feed stream to the respective electrodes. In some examples, the anion exchange layer 24 may comprise a common anion exchange layer configured to be passable for not only the monovalent anions but also polyvalent anions. In certain applications, based on different applications, for example, for removal of monovalent anions, the anion exchange layer 24 may comprise a monovalent anion exchange layer configured to be passable for monovalent anions. Similarly, the cation exchange layer 25 may comprise a common cation exchange layer or a monovalent cation exchange layer. In non-limiting examples, the anion exchange layer 24 and the cation exchange layer 25 may be common ion exchange layers.

In some embodiments, the anion exchange layer 24 and/or the cation exchange layer 25 may be freestanding to be disposed on the respective electrodes 22, 23. Alternatively, the anion exchange layer 24 and/or the cation exchange layer 25 may be coated on the surfaces of the respective electrodes 22, 23 in the form of membranes. In certain applications, the anion exchange layer 24 and/or the cation exchange layer 25 may be dispersed into the respective electrodes 22, 23. The spacer 26 is disposed between the anion exchange layer 24 and the cation exchange layer 25, and may comprise any ion-permeable, electronically non-conductive material to separate the first electrode 22 and the second electrode 23.

For the illustrated arrangement in FIG. 2, during a charging state of the desalination apparatus 11, positive and negative electrical charges from a power source accumulate on surfaces of the anode 22 and the cathode 23, respectively. A first feed stream 13 having charged species passes through the valve 17 and enters into the desalination apparatus 11 at least for hardness ions removal. Due to attraction of the positive and negative electrical charges, anions, such as $Cl^-$ and cations, such as the hardness ions in the first feed steam 13 pass through the respective anion and cation exchange layers 24, 25 so as to be accumulated on the respective electrodes 22, 23.

As a result of this charge accumulation inside the desalination apparatus 11, an effluent stream 14, which is a dilute liquid coming out of the desalination apparatus 11 via the valve 18, has a lower concentration of charged species, such as the hardness ions and $Cl^-$ as compared to the first feed stream 13. In certain embodiments, the effluent stream 14 may be again subjected to de-ionization by being fed through another desalination apparatus.

During a discharging state, the adsorbed ions, such as the hardness ions and $Cl^-$ dissociate from the surfaces of the first and second electrodes 22 and 23, respectively. A second feed stream 15 passes through the valve 17 and enters into desalination apparatus 11 to carry away the ions out of the desalination apparatus 11 during the ions dissociate from the respective electrodes and pass through the respective anion and cation exchange layers 24, 25 to contact with the second feed stream 15.

As a result, a concentrate stream 16 is produced and may have a higher concentration of charged species, such as the hardness ions as compared to the second feed stream 15. In one embodiment, for discharging, the polarities of the first and second electrodes 22, 23 may be maintained the same, a short circuit can be applied between the two electrodes so that the anions and cations are desorbed from the respective electrodes 22, 23. In another embodiment, the polarities of the first and second electrodes 22, 23 can be reversed for desorption of the ions. In certain applications, the concentrate stream 16 may be redirected into the second feed steam 15 for circulation in the discharging state of the desalination apparatus 11.

As depicted in FIG. 2, the desalination apparatus (cell) 11 further comprises ion exchange resin beads 27 disposed between the anion exchange layer 24 and the cation exchange layer 25. In non-limiting examples, the ion exchange resin beads 27 may be composed of a polymer that is configured to exchange ions therein with ions in the first feed stream 13 passing through so as to act as ion channels for ions transportation from the first feed stream 13 to the respective electrode(s) in the charging state of the desalination apparatus 11.

The ion exchange resin is widely used in water treatment processes, for example, for water softening and water purification. Generally, the ion exchange resin has insoluble materials in the form of beads of from about 0.5 mm to about 2 mm in diameter. The insoluble materials have porous structures on surfaces thereof to loosely hold ions thereon, which are exchanged with ions in a feed stream passing through without any alteration to the properties of the materials during operation. In non-limiting examples, the insoluble materials may comprise acids or bases so as to act as either cation exchange resin or anion exchange resin to exchange cation or anion in a liquid. Non-limiting examples of materials for use in the ion exchange resin beads 27 include crosslinked polystyrene or other suitable materials. In one example, the ion exchange resin beads 27 are sold by Lanxess Corporation, Birmingham, N.J., USA.

For the illustrated arrangement, the ion exchange resin beads 27 comprise anion exchange resin beads 28 and cation exchange resin beads 29 mixed with the anion exchange resin beads 28, which are also referred to as a mixed bed of the ion exchange resin beads. In certain applications, based on different applications, for example, for removal of different target ions, the ion exchange resin beads 27 may comprise one of the anion exchange resin beads and the cation exchange resin beads.

In one non-limiting example, a proportion of volumes of the anion exchange resin beads 28 and the cation exchange resin beads 29 is 1:1, and the anion exchange resin beads 28 and the cation exchange resin beads 29 may mixed uniformly, for example, the anion exchange resin beads and the cation exchange resin beads are disposed alternately, as illustrated in FIG. 2 so as to improve the ion transportation efficiency between the first feed stream and the respective electrodes. Alternatively, the anion exchange resin beads 28 and the cation exchange resin beads 29 may have different volumes and/or may be not mixed uniformly.

Thus, for example, during operation, in the charging state, during the first feed steam 13 passes through the ion exchange resin beads 27, the anion exchange resin beads 28 and the cation exchange resin beads 29 exchange respective ions so as to transport the anions and cations towards the respective electrodes 22, 23. In non-limiting examples, during operation, the electrical current passing through the desalination apparatus 11 may be controlled at a suitable lever to alleviate or avoid water splitting reactions occurring in the ion exchange resin beads 27.

Figure 3:
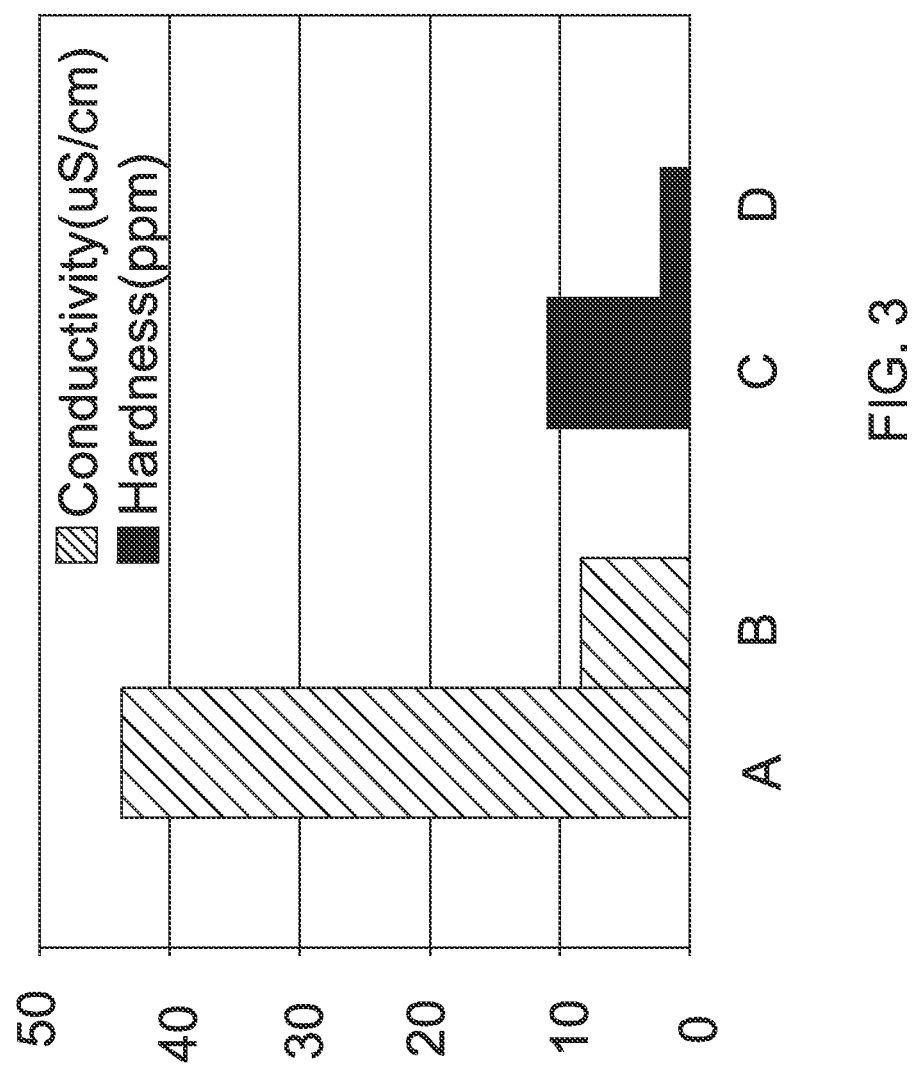
FIG. 3 is an experimental graph illustrating desalination of a first feed stream in the desalination apparatus in accordance with one embodiment of the invention.

FIG. 3 is an experimental graph illustrating desalination of a first feed stream in a desalination apparatus in accordance with the present invention. In this exemplary experiment, the experimental conditions include a flow rate of the first feed stream 13 is about 240 mL/min, a height of the ion exchange resin beads 27 is about 1.5 mm along an input direction of the first feed stream, a conductivity of the first feed stream 13 is about 43 uS/cm (as illustrated by the column A), a hardness of the first feed stream 13 is about 11 ppm (as illustrated by the column C), and an electrical current applied to the desalination apparatus 11 is about 200 mA. In one example, the first feed stream 13 includes a mixture of calcium chloride ($CaCl_2$), magnesium chloride ($MgCl_2$), and sodium bicarbonate ($NaHCO_3$) having hardness of about 11 ppm.

As illustrated in FIG. 3, after desalination of the first feed stream in the desalination apparatus 11, the conductivity of the effluent stream 14 is about 9 uS/cm (as illustrated by the column B) and a hardness of the effluent stream is about 0.9 ppm (as illustrated by the column D), which is less than 1 ppm. Accordingly, after desalination, the hardness in the first feed stream is reduced by about 90%, which shows higher hardness ion removal efficiency. Due to the higher hardness ion removal efficiency, the desalination apparatus 11 may be employed to remove hardness ions present at a relatively lower concentration in the first feed stream to increase the flexibility thereof.

Figure 4:
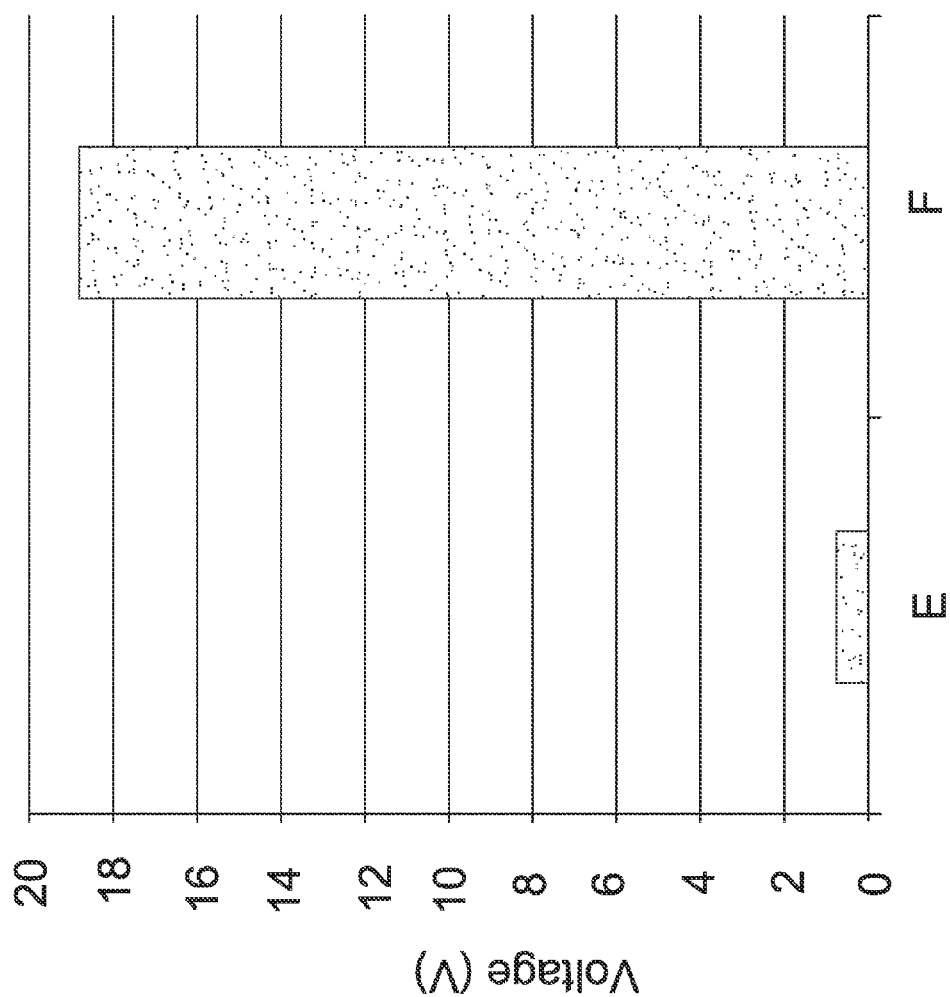
FIG. 4 is an experimental graph illustrating voltages of the desalination apparatus with and without the ion exchange resin beads during desalination in accordance with one embodiment of the invention.

Due to ion transportation of the ion exchange resin beads 27 of the desalination apparatus 11, during the target ions are transported between the first feed stream and the respective electrodes, the resistance for ion transportation is reduced resulting in relatively lower energy consumption. FIG. 4 is an experimental graph illustrating comparison of voltages on the desalination apparatus 11 with and without the ion exchange resin beads 27 when an electrical current of about 200 mA is applied during desalination. The experimental conditions are the same as those shown in FIG. 3.

As illustrated in FIG. 4, compared to the voltage of about 19V on the desalination apparatus 11 (as illustrated by the column F) without employment of the mixed bed of the ion exchange resin beads 27, the voltages are about 0.95V (as illustrated by the column E) when the mixed ion exchange resin beads 27 is employed, which shows a lower energy consumption.

In certain applications, with the employment of the ion exchange resin beads 27, the distance between the first and second electrodes 22, 23 is in a range of from about 0.5 mm to about 20 mm, for example, from about 2 mm to about 20 mm. In one non-limiting example, the distance between the first and second electrodes 22, 23 is about 8 mm, which also means the desalination apparatus 11 may process a larger amount of the first feed stream for one pass.

It should be noted that the arrangement in FIG. 2 is merely illustrative. In some applications, the desalination apparatus 11 may be employed to remove different target ions including, but not limited to the hardness ions. The anion exchange resin beads 28 and the cation exchange resin beads 29 may be disposed in other configurations including, but not limited to the configurations shown in FIGS. 2 and 5-6, for example.

Figure 5:
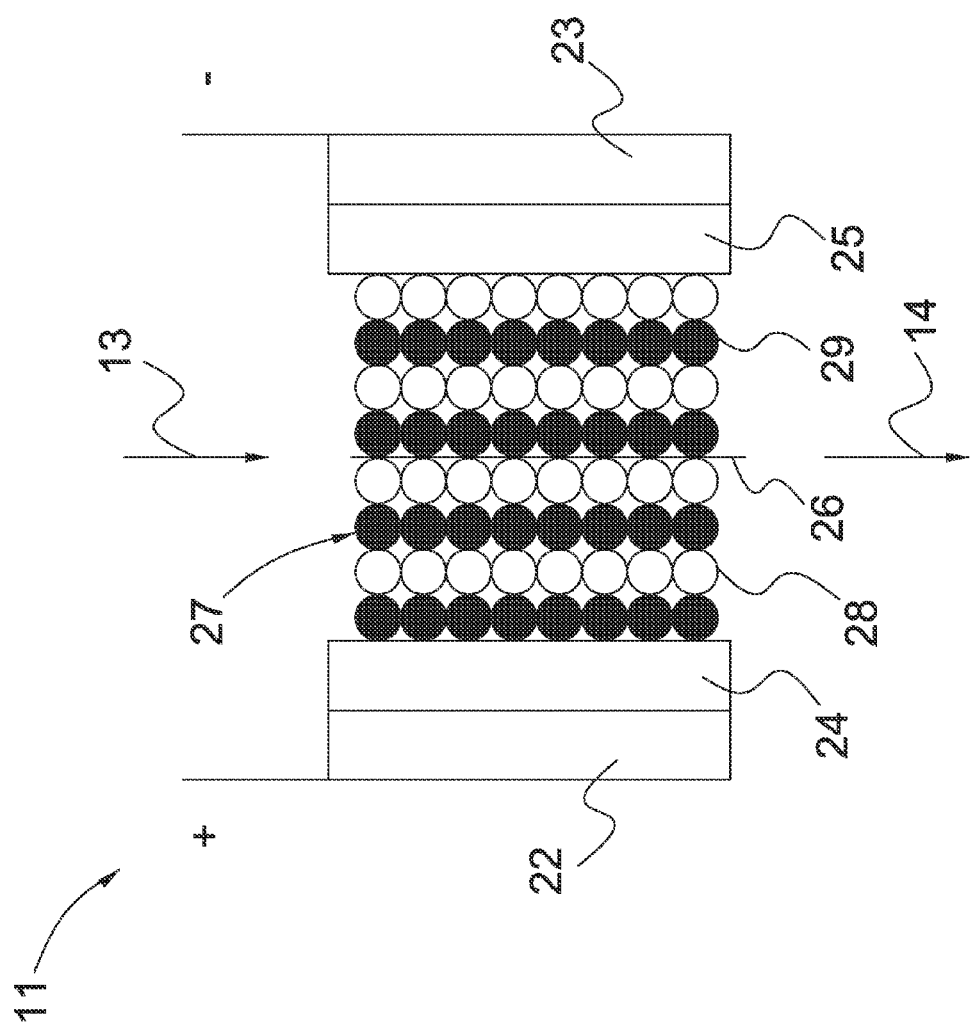
FIGS. 5-6 are schematic diagrams of arrangements of the ion exchange resin beads of the desalination apparatus in accordance with another two embodiments of the invention.
Figure 6:
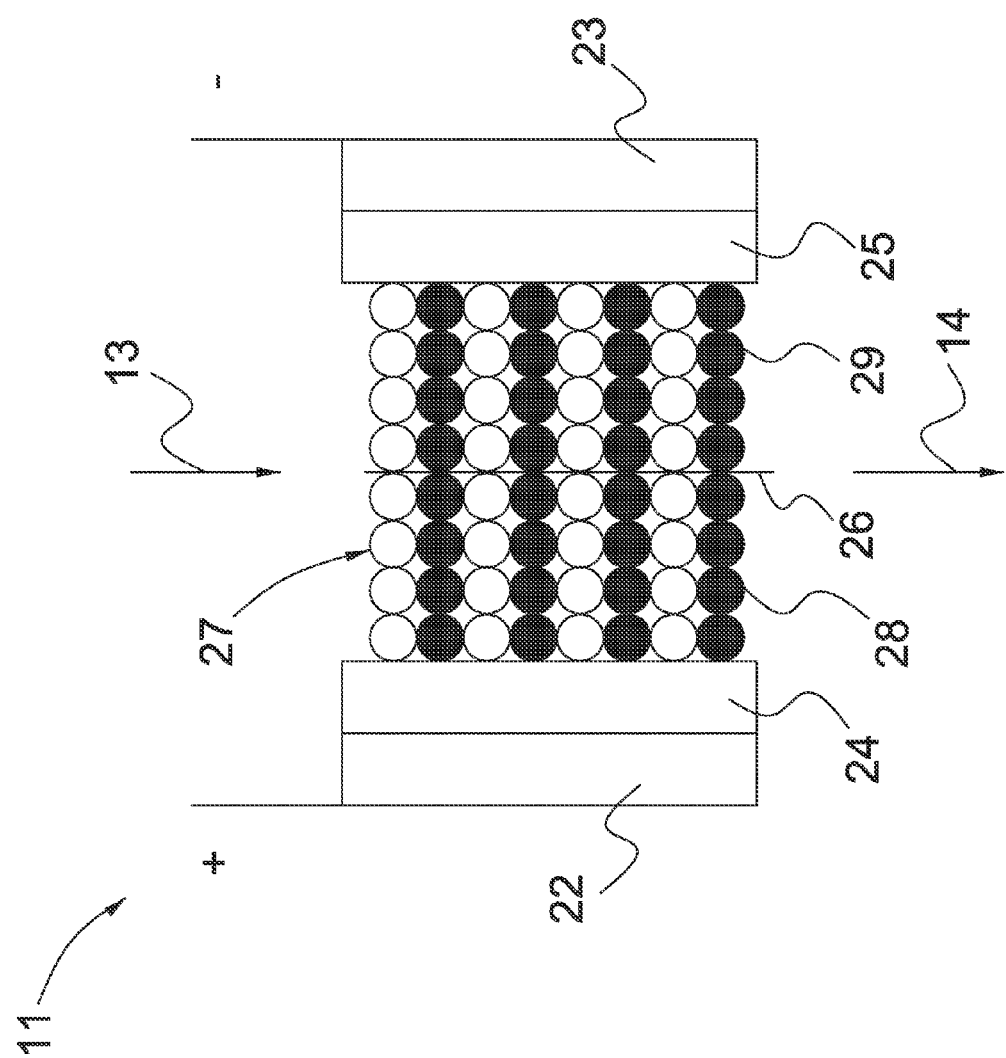

As illustrated in FIG. 5, the anion exchange resin beads 28 and the cation exchange resin beads 29 are arranged into first and second columns (not labeled) respectively along a height direction of the ion exchange resin beads 27. The first and second columns are disposed alternately along a direction between the first electrode 22 and the second electrode 23, which is perpendicular to the height direction of the ion exchange resin beads 25. As illustrated in FIG. 6, the anion exchange resin beads 28 and the cation exchange resin beads 29 are arranged into first and second rows (not labeled) respectively along the direction between the first electrode 22 and the second electrode 23. The first and second rows are disposed alternately along the height direction of the ion exchange resin beads 27.

Figure 7:
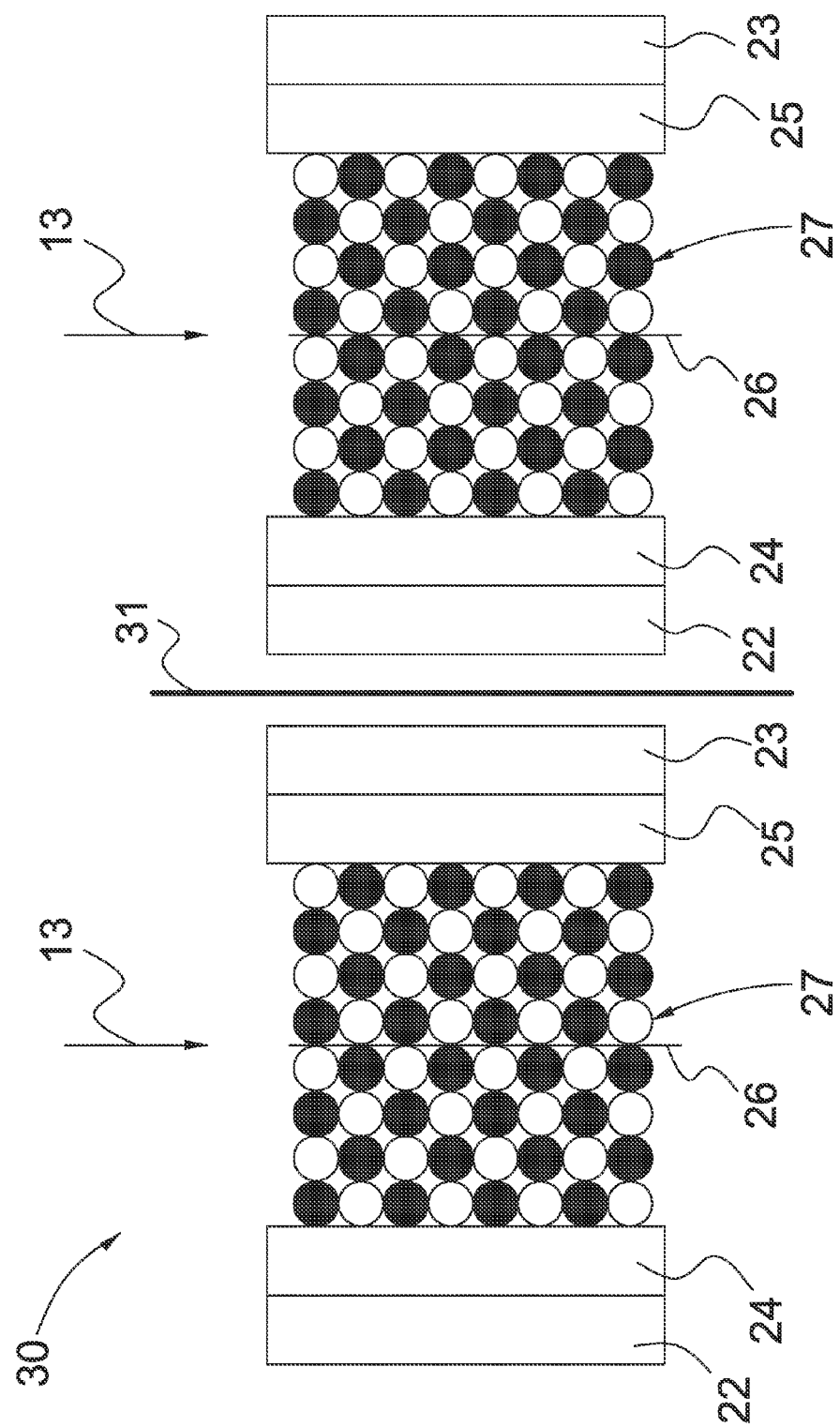
FIGS. 7-8 are schematic diagrams of a desalination device of the desalination system in accordance with two embodiments of the invention.

For some arrangements, the desalination system 10 may comprise a desalination device 30 including a plurality of the desalination apparatuses (cells) 11, shown in FIG. 2, stacked together with one or more insulating separators 31 disposed between each pair of the adjacent desalination apparatus 11, as illustrated in FIG. 7. Thus, during operation, a larger amount of a feed stream 13 may be processed with higher efficiency and lower energy consumption.

Figure 8:
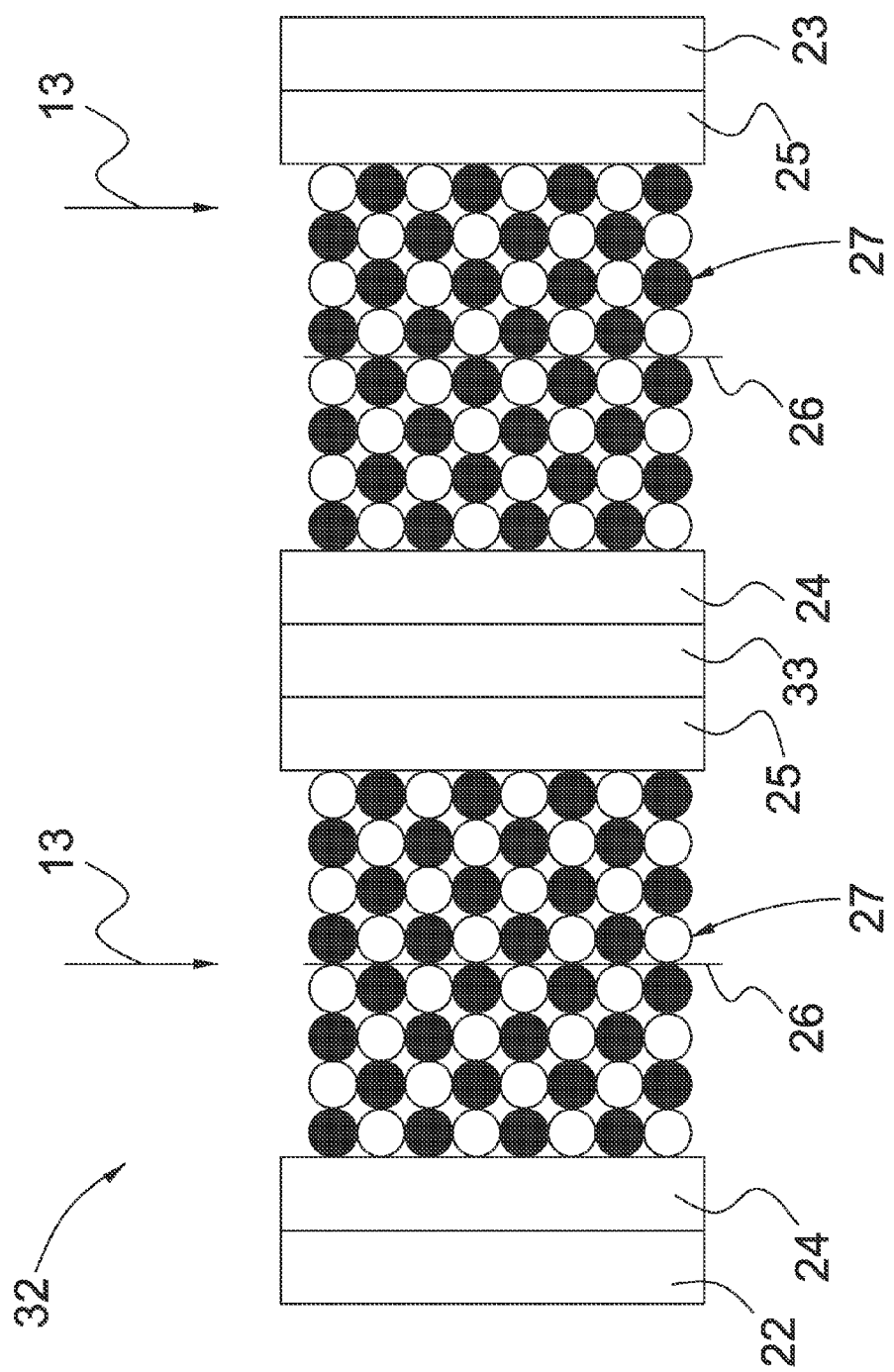

In other applications, the desalination system 10 may comprise a desalination device 32, as illustrated in FIG. 8. The desalination device 32 comprises a first electrode 22, a second electrode 23, at least one bipolar electrode 33 between the first and second electrodes 22, 23, and a plurality of spacers 26 disposed between each pair of adjacent electrodes. The ion exchange resin beads 27 is disposed between each pair of adjacent electrodes, and the anion exchange layer 24 and the cation exchange layer 25 are disposed on respective electrodes of each pair of the adjacent electrodes. The same numerals in FIGS. 2 and 5-8 indicate similar elements.

For the arrangement in FIG. 8, each bipolar electrode 33 has a positive side and a negative side, separated by an ion-impermeable layer. In some examples, the bipolar electrode may not be limited to any particular bipolar electrode. In non-limiting examples, descriptions of the bipolar electrode can be found in a publication application of US/20110024287, assigned to the General Electric Company, the contents of which are incorporated herein by reference in their entirety. Thus, similar to the arrangement in FIG. 7, during processing, a larger amount of a feed stream 13 may be processed with higher efficiency and lower energy consumption.

In embodiments of the invention, the anion and cation exchange layers, and the ion exchange resin beads are employed to remove target ions, such as hardness ions from a feed stream. In non-limiting examples, at least due to employment of the ion exchange resin beads, a feed stream having a hardness, for example of greater than 10 ppm may be processed efficiently for further processing in the EDI apparatus. This increases the flexibility and hardness tolerance of the system.

In addition, during operation, at least due to employment of the ion exchange resin beads, a relative lower energy is consumed so as to reduce the operation cost. Further, compared to the distance, for example, of 0.76 mm between paired electrodes in conventional desalination systems, for the illustrated arrangements, the distance between the paired electrodes is larger than 0.76 mm, for example in a range of 2 mm-20 mm, through which a larger amount of the feed stream pass for processing so as to improve efficiency of the system.

While the disclosure has been illustrated and described in typical embodiments, it is not intended to be limited to the details shown, since various modifications and substitutions can be made without departing in any way from the spirit of the present disclosure. As such, further modifications and equivalents of the disclosure herein disclosed may occur to persons skilled in the art using no more than routine experimentation, and all such modifications and equivalents are believed to be within the spirit and scope of the disclosure as defined by the following claims.

What is claimed is:

1. A desalination system for ion removal from an aqueous stream, comprising:
   at least one desalination cell comprising:
   first and second electrodes;
   an anion exchange layer and a cation ion exchange layer disposed on the respective first and second electrodes;
   a spacer disposed between the first and second electrodes; and
   ion exchange resin disposed between the anion exchange layer and the cation exchange layer, wherein the ion exchange resin comprises a mixture of anion exchange resin beads and cation exchange resin beads.

2. The desalination system of claim 1, wherein a proportion of volumes of the anion exchange resin beads and the cation exchange resin beads is 1:1.

3. The desalination system of claim 1, wherein a distance between the first and second electrodes is in a range from about 2 mm to about 20 mm.

4. The desalination system of claim 3, wherein the distance between the first and second electrodes is about 8 mm.

5. The desalination system of claim 1, wherein the desalination system comprises a plurality of the desalination cells stacked together with at least one insulating separator disposed between each pair of the adjacent desalination cells.

6. The desalination system of claim 1, further comprising an EDI apparatus in fluid communication with the at least one desalination cell for further processing of an effluent stream from the at least one desalination cell.

7. The desalination system of claim 1, wherein the at least one desalination cell is configured to remove hardness ions from a feed stream.

8. The desalination system of claim 1, wherein the spacer comprises an ion-permeable, electronically nonconductive material.

9. The desalination system of claim 1, wherein at least one of the first and second electrodes includes electrically conductive materials.

10. The desalination system of claim 9, wherein the electrically conductive materials include one or more carbon materials.

11. The desalination system of claim 10, wherein the carbon materials are selected from the group consisting of activated carbon particles, porous carbon particles, carbon fibers, carbon aerogels, porous mesocarbon microbeads and combinations thereof.

12. The desalination system of claim 1, wherein the anion exchange layer is coated on the surface of the first electrode.

13. The desalination system of claim 12, wherein the cation exchange layer is coated on the surface of the second electrode.

14. The desalination system of claim 1, wherein the cation exchange layer is coated on the surface of the second electrode.

15. The desalination system of claim 1, wherein the anion exchange layer is dispersed into the first electrode.

16. The desalination system of claim 15, wherein the cation exchange layer is dispersed into the second electrode.

17. The desalination system of claim 1, wherein the cation exchange layer is dispersed into the second electrode.

* * * * *